US012416797B2

(12) United States Patent
Christ

(10) Patent No.: US 12,416,797 B2
(45) Date of Patent: Sep. 16, 2025

(54) MICROSCOPE AND METHOD FOR EXAMINING A SAMPLE

(71) Applicant: Leica Microsystems CMS GmbH, Wetzlar (DE)

(72) Inventor: Stefan Christ, Schoeffengrund (DE)

(73) Assignee: LEICA MICROSYSTEMS CMS GMBH, Wetzlar (DE)

( * ) Notice: Subject to any disclaimer, the term of this patent is extended or adjusted under 35 U.S.C. 154(b) by 703 days.

(21) Appl. No.: 17/829,392

(22) Filed: Jun. 1, 2022

(65) Prior Publication Data
US 2022/0397753 A1    Dec. 15, 2022

(30) Foreign Application Priority Data

Jun. 11, 2021    (EP) ..................................... 21179092

(51) Int. Cl.
*G02B 21/26*    (2006.01)
*G02B 21/36*    (2006.01)

(52) U.S. Cl.
CPC ............. *G02B 21/26* (2013.01); *G02B 21/36* (2013.01)

(58) Field of Classification Search
CPC ........... G02B 21/00–368; B01L 3/0293; B01L 2/021–237

USPC .................................................. 359/368–398
See application file for complete search history.

(56) References Cited

U.S. PATENT DOCUMENTS

| 2005/0012990 A1* | 1/2005 | Otaki ................. G02B 21/0088 359/368 |
| 2017/0022537 A1* | 1/2017 | Stock ..................... G01N 21/76 |
| 2018/0128676 A1 | 5/2018 | Katzlinger et al. |

OTHER PUBLICATIONS

Dettinger, Philip et al. "Open-source personal pipetting robots with live-cell incubation and microscopy compatibility," Nature Communications, UK, pp. 1-12, May 30, 2022.

* cited by examiner

*Primary Examiner* — Jessica M Merlin
(74) *Attorney, Agent, or Firm* — LEYDIG, VOIT & MAYER, LTD.

(57) ABSTRACT

A microscope includes: a sample chamber; a microscope stage arranged below the sample chamber for having a sample carrier arranged thereon; a pipetting device for pipetting the sample carrier; and a moving mechanism for moving the pipetting device between a non-operating position in which the pipetting device is arranged outside the sample chamber sample carrier and an operating position in which the pipetting device is arranged inside the sample chamber facing the sample carrier.

13 Claims, 3 Drawing Sheets

MICROSCOPE AND METHOD FOR EXAMINING A SAMPLE

CROSS-REFERENCE TO PRIOR APPLICATION

Priority is claimed to European Patent Application No. EP 21179092.8, filed on Jun. 11, 2021, the entire disclosure of which is hereby incorporated by reference herein.

FIELD

The invention relates to a microscope. Further, the invention relates to a method for examining a sample by means of a microscope.

BACKGROUND

Experiments in the life sciences often involve the microscopic study of samples that have been manipulated or treated with various chemicals called reagents in order to study and understand biological processes. These experiments typically involve manual pipetting, e.g. injecting a fluid such as a reagent into a sample. Especially for experiments with a high throughput, for example when using multi well plates, this is a time consuming task. Every necessary human interaction decreases the walk-away time of an experiment, and thus, the efficiency of the experiment. Many experiments also require multiple reagents to be added to the samples in quick succession, while the actual reaction to be observed may take multiple minutes, hours, or even days. While other experiments take place over a very short period of time, for example tracking neuronal activities. Ideally, for this type of experiment, the reagents are introduced and mixed into the sample while image acquisition is taking place.

Manually pipetting samples is not only tedious and time consuming, it also increases the risk of contaminating the samples. It is therefore desirable to automate the pipetting process as much as possible.

SUMMARY

In an embodiment, the present invention provides a microscope, comprising: a sample chamber; a microscope stage arranged below the sample chamber configured to have a sample carrier arranged thereon; a pipetting device configured to pipet the sample carrier; and a moving mechanism configured to move the pipetting device between a non-operating position in which the pipetting device is arranged outside the sample chamber sample carrier and an operating position in which the pipetting device is arranged inside the sample chamber facing the sample carrier.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
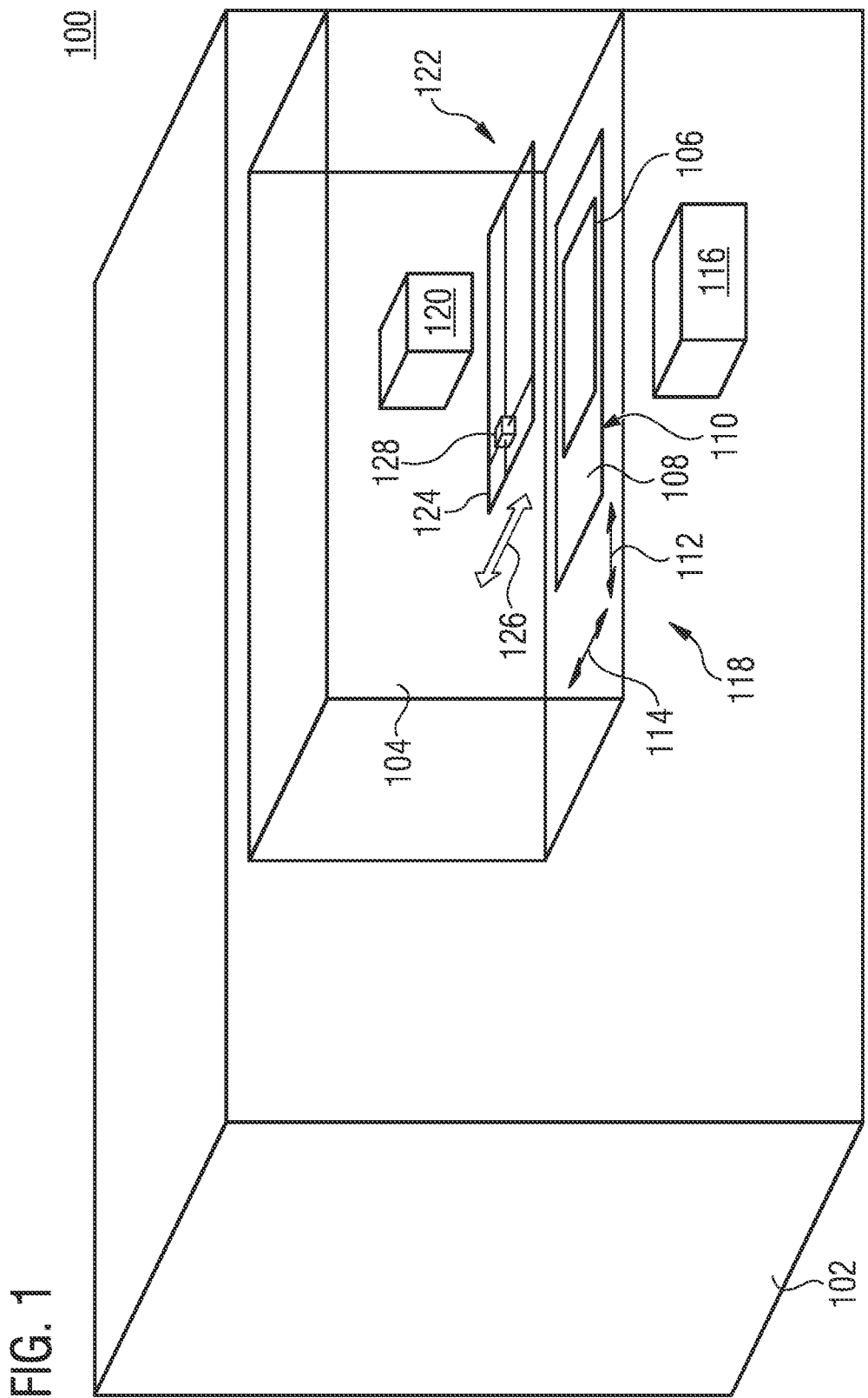
FIG. 1 is a schematic view of a microscope.

In an embodiment, the present invention provides a microscope and a method for examining a sample by means of a microscope that allow for automated pipetting.

The proposed microscope comprises a sample chamber, a microscope stage arranged below the sample chamber configured to have a sample carrier arranged thereon, a pipetting device configured to pipet the sample carrier, and a moving mechanism. The moving mechanism is configured to move the pipetting device between a non-operating position in which the pipetting device is arranged outside the sample chamber and an operating position in which the pipetting device is arranged inside the sample chamber facing the sample carrier.

Within the context of this document pipetting can mean dropping a fluid onto a sample, injection a sample with a fluid or removing a fluid from a sample or well of a sample carrier.

The sample or samples are arranged inside the sample chamber, and thereby protected from the environment. In particular, the sample chamber may be formed as a sterile environment protecting the samples from being contaminated. In order to pipet the samples, the pipetting device is brought from outside the sample chamber into the sample chamber by the moving mechanism. No human interaction is required and the pipetting process is easily automated. Thereby, the device can easily be integrated into a workflow design, in particular by means of software such as an experiment designer. The possibility of automation combined with the reduced risk of contamination means the device has a long walk-away time resulting in more efficient experiment designs.

In a preferred embodiment, the pipetting device comprises at least one movable injector configured to drop or inject a fluid into the sample carrier. Preferably, the injector includes at least one injection nozzle which is arranged to face the sample carrier when the pipetting device is in the operating position. In particular, the movement of the at least one is independent of the movement of the pipetting device between the non-operating position and the operating position. This way, individual pipetting positions, for example single wells of a microwell plate, can be targeted for dropping or injecting the fluid.

In another preferred embodiment, the pipetting device includes at least one fluid line which is coupled to a fluid reservoir. In particular, the fluid line may be formed from an elastomer. Providing the fluid in the fluid reservoir allows multiple pipetting processes to be performed in succession. This increases the walk-away time of the device even further.

In another preferred embodiment, the pipetting device comprises a frame on which the at least one injector is mounted. The frame is coupled to the moving mechanism to be moved between the non-operating position and the operating position. Providing a frame for the injector increases the overall stability of the device during movement. This, in turn, allows for faster and more precise pipetting of the samples. Thereby increasing the efficiency and throughput of the device.

In another preferred embodiment, the pipetting device comprises an injector drive configured to move the injector along at least one direction relatively to the frame to selectively arrange the injector in a plurality of pipetting positions relative to the sample carrier when the frame is in the operating position. In this embodiment, the device has two modes of movement. In a first mode, the whole frame is moved from the non-operating position to the operating position and back. In the second mode, only the injector is moved to any of the pipetting positions in order to pipet the sample located at said pipetting position. By moving only the injector, which typically is much lighter than the whole frame, a very fine control over the injectors position can be achieved.

In another preferred embodiment, the injector is movable along two orthogonal directions of a rectangular 2D motion grid adapted to the sample carrier. In this embodiment, the injector is arranged movable in two orthogonal direction. This movement is analogous to the movement of an X-Y table. In particular, the injector is movable in a plane which is parallel to a surface of the microscope stage on which the sample carrier is to be arranged. Typically, the individual wells of a microwell plate are arrange in columns and rows. By moving the injector in a rectangular 2D motion grid, individual pipetting positions corresponding to single wells, can be targeted for injecting fluids.

In another preferred embodiment, the frame has a rectangular shape adapted to the sample carrier. Most sample carriers, with the notable exception of petri dishes, are rectangular. Adapting the geometry of the frame to the geometry of the sample carrier results in an optimized use of construction space inside the microscope.

In another preferred embodiment, the sample carrier comprises a plurality of sample cavities, each cavity being configured to receive a sample which is to be pipetted by the pipetting device. The sample carrier may for example be a microwell plate. These sample carriers have normed dimensions, meaning that the pipetting positions can be predetermined. In other words, the moving mechanism and the injector drive do not have to be calibrated each experiment. This reduces setup time and increases overall efficiency of the device.

In another preferred embodiment, the microscope comprises a box-type microscope housing defining the sample chamber above the microscope stage and a storage chamber spatially separated from the sample chamber. The moving mechanism is configured to move the pipetting device, in particular the frame thereof, between the storage chamber and the sample chamber. Box-type microscopes comprise a housing in which all the microscopes components are arranged. The housing typically comprises one or more openings for accessing the inside of the microscope. Due to the enclosed or even sealed nature of the housing, box-type microscopes are especially suited for precisely controlling the environment of the samples, for example by a climate control unit. In this embodiment, both the storage chamber and the sample chamber are located inside the box-type microscope housing. This means, that both the environment of the storage chamber and the sample chamber can be precisely controlled or separated from each other when the pipetting device is not in use.

In another preferred embodiment, the storage chamber is spatially separated from the sample chamber by a wall comprising a retraction opening through which the pipetting device, in particular the frame thereof, is movable between the storage chamber and the sample chamber. The wall allows the environment of the sample chamber to be controlled independently of the environment of the storage space. The retraction opening forms an airlock that keeps the sample chamber enclosed. This makes the environment of the sample chamber much easier to control.

In another preferred embodiment, the box-type microscope housing defines a component space below the microscope stage, the component space including a plurality of microscope components. The component space may include a power source of the microscope, an optical imaging system, an illumination system, filters, an environmental control unit.

In another preferred embodiment, the microscope comprises a stage drive configured to laterally move the microscope stage in a plane which is parallel to the surface of the microscope stage on which the sample carrier is to be arranged. In particular, the plane of movement of the microscope stage is parallel to a plane in which the injector is moved. Thereby, the distance between the injector and the sample carrier is the same for all pipetting positions and positions of the microscope stage. This allows for precise pipetting.

In another preferred embodiment, the microscope comprises a controller configured to synchronize a pipetting operation and an imaging operation. The controller may for example be a processor that is arranged inside the microscope itself or an external device such as a PC that is connected to the microscope. The controller allows the microscope to work autonomously and to be integrated into an automated workflow. Thereby, the walk-away time and thus the efficiency of the microscope are further increased.

The invention also relates to a method for examining a sample by mean of a microscope. The proposed method comprises the following steps: Moving the pipetting device from the non-operating position in a storage chamber outside a sample chamber of the microscope into the operating position inside the sample chamber to arrange the pipetting device facing the sample carrier. Pipetting the sample carrier by means of the pipetting device. Moving the pipetting device from the operating position into the non-operating position to arrange the pipetting device remote from the sample carrier. Imaging the sample.

The method has the same advantages as the microscope described above and can be supplemented using the features described herein directed at the microscope.

FIG. 1 is a schematic view of a microscope 100. The microscope 100 is exemplary formed as a box-type microscope.

Conventional microscopes comprise a microscope stand which holds all microscope components. The open nature of the conventional microscope allows easy access to all its components. However, due to the open nature samples arranged on a conventional microscope are exposed to the environment. Further, the microscope stand typically blocks access to the sample from one side.

Figure 2:
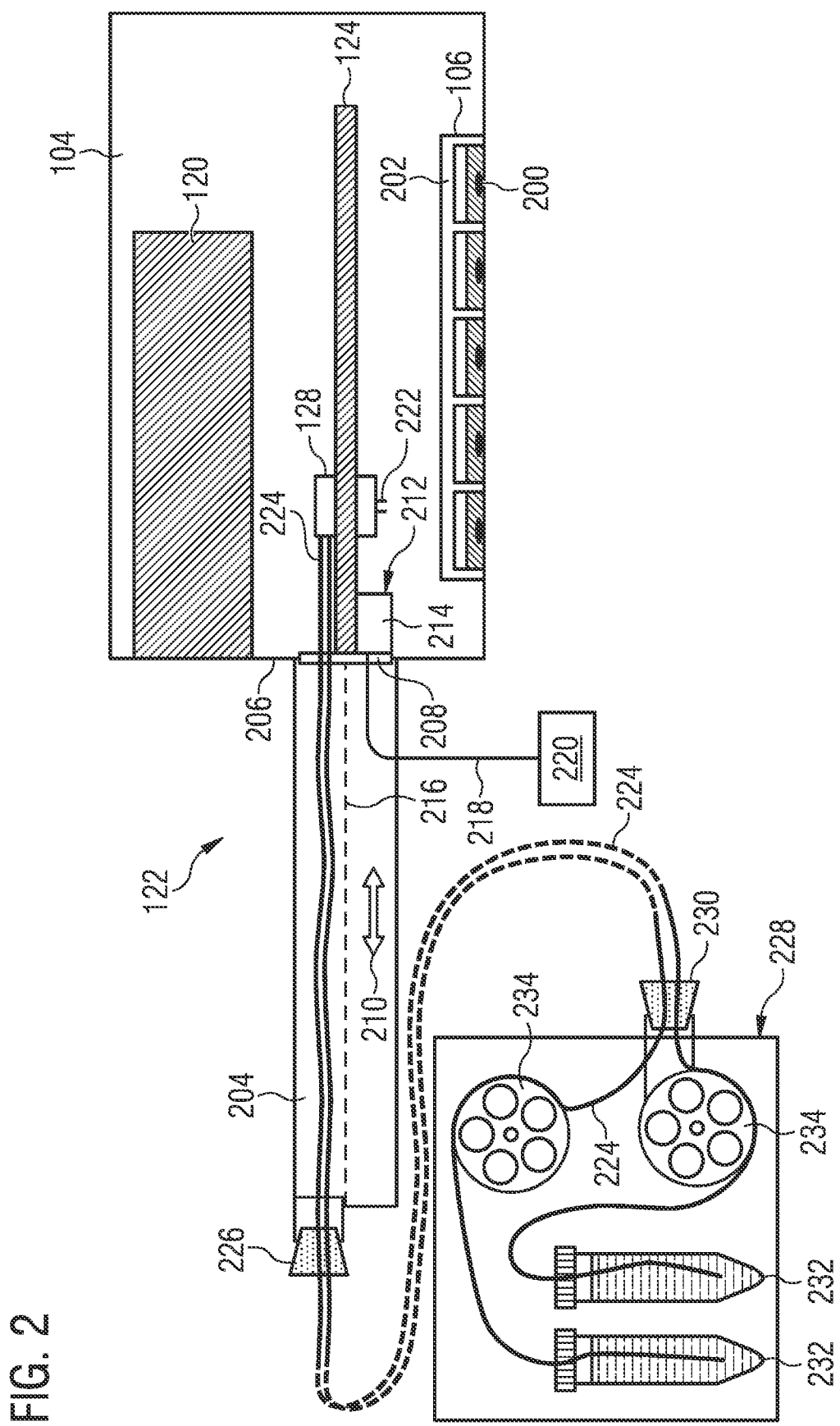
FIG. 2 is schematic view of a pipetting device of the microscope according to FIG. 1.

In contrast thereto, box-type microscope 100 shown in FIG. 1 is completely enclosed inside a microscope housing 102. In particular, the microscope housing 102 forms a sample chamber 104 for receiving one or more samples 200 (c.f. FIG. 2). By enclosing the samples 200, a precise control over the samples' 200 environment is possible, for example via a climate control unit for controlling temperature and humidity of the sample chamber 104. The enclosed samples 200 are also shielded against the environment, and thus protected against accidental contamination. Further, the sample chamber 104 can easily be made into an incubation chamber and/or a sterile environment, if an experiments demands it.

The samples 200 are arranged in a sample carrier 106, for example a microwell plate or a microscope slide. Sample carriers 106 such as a microwell plate typically comprise a number of individual cavities or wells 202 (c.f. FIG. 2) for arranging the samples 200, while a microscope slide typically holds an individual sample. The sample carrier 106 is positioned on a top surface 108 of a microscope stage 110, that is arranged below the sample chamber 104. The microscope stage 110 is movable along two orthogonal directions, i.e. the microscope stage 110 is a so called X-Y-table. This is indicated in FIG. 1 by two double-arrows 112, 114. Thus, moving the microscope stage 110 allows for example for selecting individual cavity 202 of the sample carrier 106 or selecting a specific region of interest of a single sample 200 for observation.

The microscope 100 according to FIG. 1 is exemplary formed as a transmitted light microscope. Imaging optics 116 for imaging the samples 200 are exemplary arranged below the microscope stage 110 in a component space 118 and an illumination system 120 for illuminating the samples 200 is arranged above the microscope stage 110 inside the sample chamber 104. The optical axis of the imaging optics 116 and the optical axis of the illumination system 120 are aligned. Thereby, illumination light emitted by the illumination system 120 passes through the samples 200 before entering the imaging optics 116. In an alternative embodiment, the positions of the imaging optics 116 and the illumination system 120 may be reversed. In another alternative embodiment, both the imaging system 116 and the illumination system 120 are arranged on the same side of the microscope stage 110. Additional components such as a power source of various filters may be arranged in the component space The microscope 100 further comprises a pipetting device 122 for pipetting the samples 200, for example introducing various liquid reagents into the samples 200. The pipetting device 122 comprises a rectangular frame 124 that is of similar size and dimension as the sample carrier 106. The frame 124 is arranged parallel to the top surface 108 of the microscope stage 110 and is moveable along one direction from non-operating position to an operating position and back. The movement of the frame 124 is indicated in FIG. 1 by a double-arrow 126. The direction of movement is exemplary show to be parallel to the top surface 108 of the microscope stage 110. The non-operating position of the frame 124 is outside the sample chamber 104, for example inside a storage chamber (c.f. FIG. 2), while the operating position of the frame 124 is inside the sample chamber 104.

Figure 3:
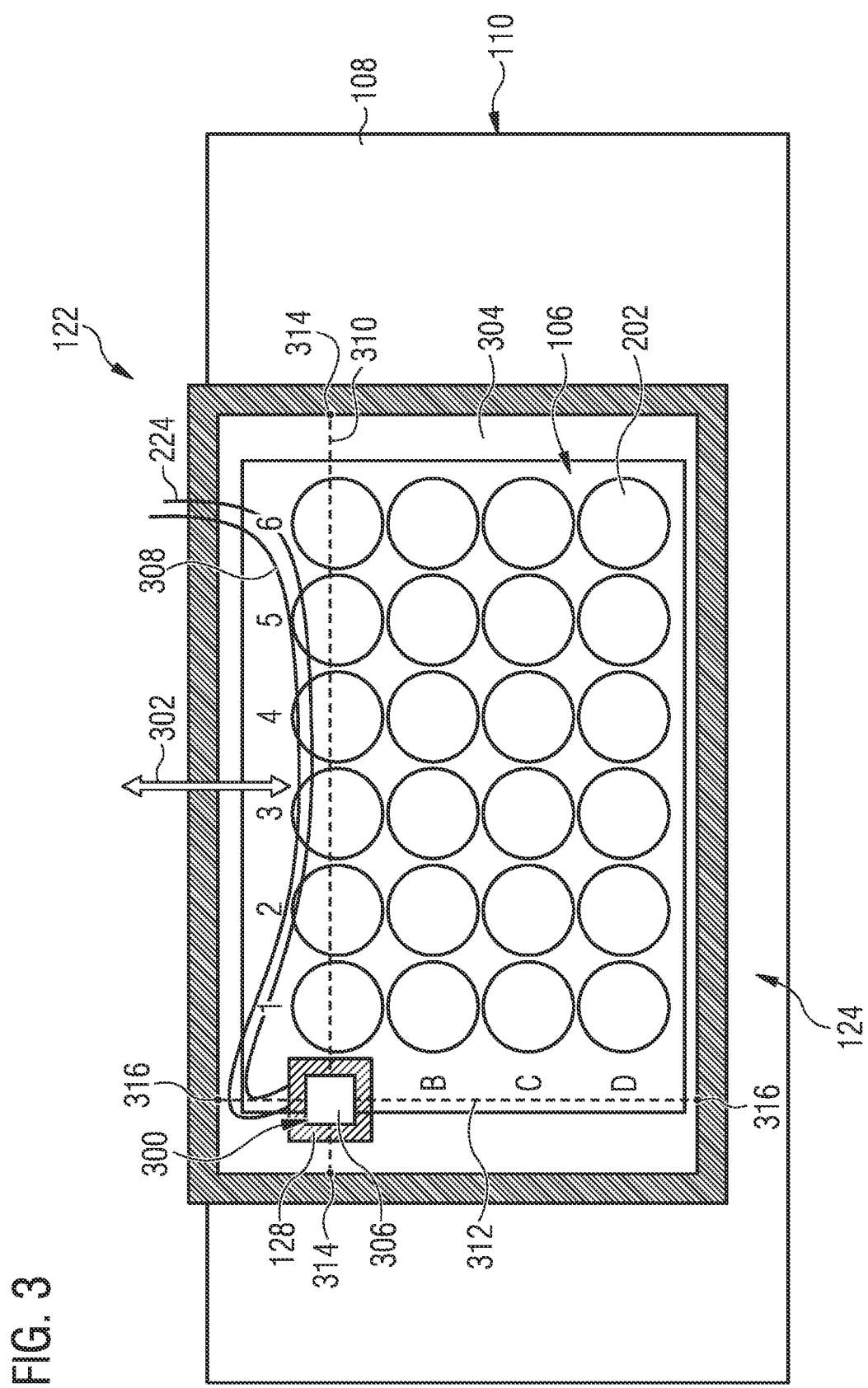
FIG. 3 is a top view of the pipetting device according to FIGS. 1 and 2.

The frame 124 holds one or more injectors 128, of which only one injector 128 is shown in FIG. 1. The injectors 128 are moveable inside the frame 124 by means of an injector drive 300 (c.f. FIG. 3). Thus, the injectors 128 can target individual wells 202 of the sample carrier 106 for pipetting. The pipetting device 122 is described in further detail below with reference to FIGS. 2 and 3.

FIG. 2 is a schematic view of the pipetting device 122 of the microscope 100 according to FIG. 1. In FIG. 2, the frame 124 is exemplary shown to be in the operating position, i.e. inside the sample chamber 104.

A storage chamber 204 for storing the frame 124 in its non-operating position is located to the left of the sample chamber 104 in FIG. 2. The storage chamber 204 is spatially separate from the sample chamber 104 and shielded against the environment. A wall 206 separates the storage chamber 204 from the sample chamber 104. The wall 206 comprises a retraction opening 208 through which the frame 124 can be moved from its operating position to the non-operating position and vice versa. The retraction opening 208 can be closed, when the frame 124 is in its non-operating position, in order to shield the sample chamber 104 from the storage chamber 204.

The movement of the frame 124 takes place along an axis parallel to the top surface 108 of the microscope stage 110 as is indicated in FIG. 2 by double-arrows 210. The frame 124 is moved by a moving mechanism that comprises a motor 214, for example a linear stepper motor, and guiding rails 216 along which the frame 124 is moved. The motor 214 is exemplary arranged on the frame 124 and connected via a flexible cable 218 to a motor controller 220, that provides the motor 214 with energy and control signals.

As can be seen in FIG. 2, the injectors 128 of the frame 124 comprise one or more injector nozzles 222 for introducing a fluid into samples 200. The nozzles 222 are arranged on an underside of the injectors 128 facing the sample carrier 106. Two fluid lines 224, i.e. one fluid line 224 for each nozzle 222, are connected the injector 128. The fluid lines 224 are made from an elastic material such as an elastomer, so they can deform when the injector 128 is moved inside the frame 124 or the frame 124 itself is moved from its operating position to the non-operating position and vice versa. In particular, the fluid lines 224 can be removed for cleaning or disposal in order to prevent contamination of the samples 200. The fluid lines 224 run through the storage chamber 204 to a stopper 226 that is arranged at and end of the storage chamber 204 opposite to the retraction opening 208. The fluid lines 224 are guided through the stopper 226 to a fluid reservoir 228 for storing the various fluids to be introduced into the samples 200.

The fluid reservoir 228 is arranged separate from the sample chamber 104 and the storage chamber 204. The fluid lines 224 enter the fluid reservoir 228 through a stopper 230. Each fluid line 224 ends in a separate fluid storage tube 232 for storing a single fluid, for example a reagent. The fluid storage tubes 232 can be removed from the fluid reservoir 228 in order to refill or exchange the fluid contained therein. In particular, the fluid storage tubes 232 are formed by disposable plasticware tubes of standardized size. This allows high interoperability with other laboratory equipment and prevents contamination of the fluid. The fluid reservoir 228 further comprises pumps 234 for pumping the fluid from its fluid storage tube to one of the nozzles 222. The pumps 234 are exemplary formed as peristaltic pumps, further preventing contamination.

FIG. 3 is a top view of the pipetting device 122 according to FIGS. 1 and 2. In FIG. 3, the frame 124 is exemplary shown to be in the operating position, i.e. inside the sample chamber 104. The movement of the frame 124 from its operating position to the non-operating position and vice versa takes place along an axis that runs from top to bottom in FIG. 3, as is indicated by a double-arrow 302.

The injector 128 is arranged in an inside 304 of the frame 124 and can be moved in two orthogonal directions by means of the injector drive 300. The injector drive 300 exemplary comprises two linear stepper motors 306, i.e. one for each direction. The motors 306 are connected to a flexible cable 308 that runs parallel to the fluid lines 224. The flexible cable 308 connects to the motor controller, that provides the motors 306 with energy and control signals. The injector drive 300 further comprises two rods 310, 312 on which the injector 128 itself is mounted. Each rod 310, 312 is engaged with two guide rails 314, 316, that face the inside of the frame 124 from opposite sides. Thus, the movement of the injector takes place in a plane defined by the frame 124.

The inside of the frame 124 is rectangular and dimensioned such that the injector 128 can be positioned above each well 202 of the sample carrier 106 in order to pipet the sample 200 contained therein. Each such position is called a pipetting position. The inside of the frame 124 further extends to the left such that the injector 128 can be positioned in an idle position, i.e. a position in which the injector is not above any well 202, as is shown in FIG. 2.

The sample carrier 106 is exemplary formed as a multi well 202 plate having 24 wells 202 arranged in 4 rows and 6 columns. The rows are labelled A to D and the columns are labelled 1 to 6 in order to uniquely identify each well 202.

Identical or similarly acting elements are designated with the same reference signs in FIGS. 1 to 3. As used herein the term "and/or" includes any and all combinations of one or more of the associated listed items and may be abbreviated as "/".

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

100 Microscope
102 Housing
104 Sample chamber
106 Sample carrier
108 Surface
110 Microscope stage
112, 114 Arrows
116 Imaging system
118 Component space
120 Illumination system
122 Pipetting device
124 Frame
126 Arrow
128 Injector
200 Sample
202 Well
204 Storage chamber
206 Wall
208 Opening
210 Arrow
212 Moving mechanism
214 Motor
216 Rails
218 Cable
220 Controller
222 Nozzle
224 Fluid line
226 Stopper
228 Fluid reservoir
230 Stopper
232 Fluid storage tubes
234 Pump
300 Injector drive
302 Arrow
304 Inside
306 Motor
308 Cable

What is claimed is:

1. A microscope, comprising:
a sample chamber;
a microscope stage arranged below the sample chamber configured to have a sample carrier arranged thereon;
a pipetting device configured to pipet the sample carrier, wherein the pipetting device comprises at least one movable injector configured to drop or inject fluid into the sample carrier; and
a moving mechanism configured to move the pipetting device between a non-operating position in which the pipetting device is arranged outside the sample chamber and an operating position in which the pipetting device is arranged inside the sample chamber facing the sample carrier, wherein the pipetting device comprises a frame on which the at least one injector is mounted, the frame being coupled to the moving mechanism so as to be movable, in a direction parallel to a top surface of the microscope stage, between the non-operating position and the operating position.

2. The microscope of claim 1, wherein the injector includes at least one injection nozzle which is arranged to face the sample carrier when the pipetting device is in the operating position.

3. The microscope of claim 1, wherein the pipetting device includes at least one fluid line which is coupled to a fluid reservoir.

4. The microscope of claim 1, wherein the pipetting device comprises an injector drive configured to move the injector along at least one direction relative to the frame to selectively arrange the injector in a plurality of pipetting positions relative to the sample carrier when the frame is in the operating position.

5. The microscope of claim 1, wherein the injector is movable along two orthogonal directions of a rectangular 2D motion grid adapted to the sample carrier.

6. The microscope of claim 1, wherein the frame has a rectangular shape adapted to the sample carrier.

7. The microscope of claim 1, wherein the sample carrier comprises a plurality of sample cavities, each sample cavity of the plurality of sample cavities being configured to receive a sample for pipetting by the pipetting device.

8. The microscope of claim 1, further comprising:
a box-type microscope housing defining the sample chamber above the microscope stage and a storage chamber spatially separated from the sample chamber,
wherein the moving mechanism is configured to move the pipetting device between the storage chamber and the sample chamber.

9. The microscope of claim 8, wherein the storage chamber is spatially separated from the sample chamber by a wall comprising a retraction opening through which the pipetting device is movable between the storage chamber and the sample chamber.

10. The microscope of claim 8, wherein the box-type microscope housing defines a component space below the microscope stage, the component space including a plurality of microscope components.

11. The microscope of claim 1, further comprising:
a stage drive configured to laterally move the microscope stage in a plane which is parallel to a surface of the microscope stage on which the sample carrier is to be arranged.

12. The microscope of claim 1, further comprising:
a controller configured to synchronize a pipetting operation and an imaging operation.

13. A method for examining a sample by the microscope of claim 1, the method comprising:
moving the pipetting device from the non-operating position in a storage chamber outside the sample chamber of the microscope into the operating position inside the sample chamber to arrange the pipetting device facing the sample carrier;
pipetting the sample carrier by the pipetting device;
moving the pipetting device from the operating position into the non-operating position to arrange the pipetting device remote from the sample carrier; and
imaging the sample.

* * * * *